Mar. 3, 1925. 1,528,346
J. J. STAMPEN
MOTOR MOUNTING
Filed June 7, 1923
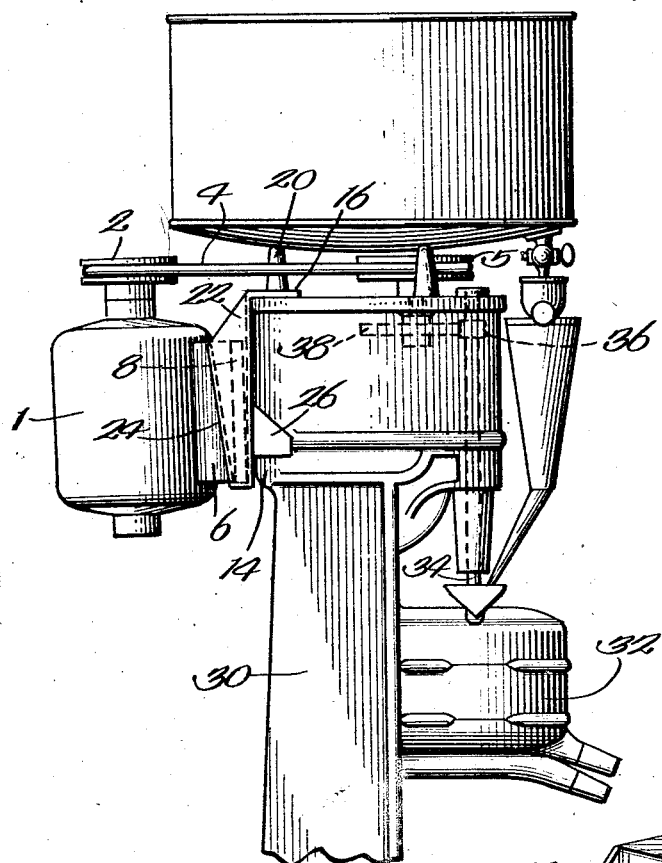
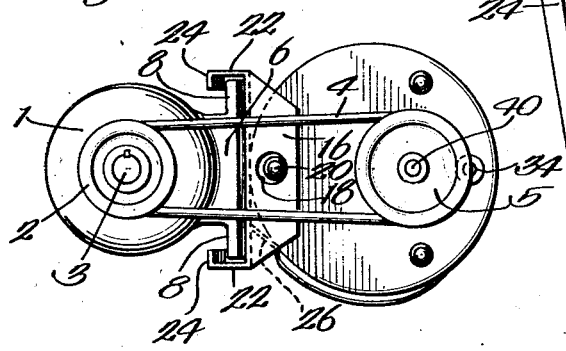
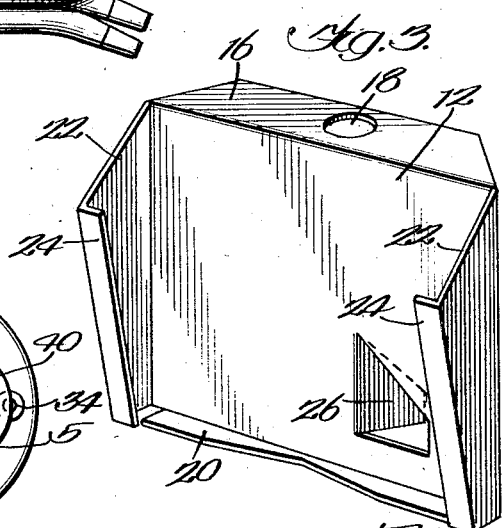
Inventor:
Jacob J. Stampen
By Cheever & Cox Attys.

Patented Mar. 3, 1925.

1,528,346

UNITED STATES PATENT OFFICE.

JACOB J. STAMPEN, OF CHICAGO, ILLINOIS, ASSIGNOR TO BABSON BROTHERS, OF CHICAGO, ILLINOIS, A CORPORATION OF ILLINOIS.

MOTOR MOUNTING.

Application filed June 7, 1923. Serial No. 644,011.

*To all whom it may concern:*

Be it known that I, JACOB J. STAMPEN, a citizen of the United States, residing at Chicago, in the county of Cook and State of Illinois, have invented a certain new and useful Improvement in Motor Mountings, of which the following is a specification.

My invention relates to motor mountings, and the object is to provide a slip connection of special type between the motor and the machine element which the motor is intended to drive. My construction is especially useful for driving cream separators. In such machinery the separator bowl, when filled, is quite heavy and yet it is customary to expect a rotation of as high as 8000 R. P. M. when driven by an electric motor of only one-sixth or one-quarter horse power. My purpose is to make this practicable by providing a special type of mounting in which slippage may occur while the bowl is coming up to speed, thus avoiding any danger of burning out the motor.

Another object is to provide a construction such that the motor shaft will be supported in substantially upright position and will swing in a vertical plane as the slippage increases or decreases. This is of special utility in cream separators because the axis of rotation of a cream separator is necessarily vertical, and by supporting the motor shaft in substantially vertical position the mechanism for connecting the motor shaft to the separator shaft is greatly simplified.

While the principle of my invention is not limited to cream separators, I have chosen to illustrate it in connection with such a machine.

In the accompanying drawings Figure 1 is a side elevation of my invention as applied to a cream separator.

Figure 2 is a top plan view of some of the parts shown in Figure 1, particularly the motor and its pulley, the driven pulley and belt, and parts immediately beneath.

Figure 3 is a perspective view of the hanger by which the motor is suspended from the separator.

Like numerals denote like parts throughout the several views.

In the form selected to illustrate the invention the motor 1 has a pulley 2 secured to the motor shaft 3. The pulley 2 drives a belt 4 which in turn drives a driven pulley 5 which actuates the machine. In the illustrated type the motor has a base 6 having lateral flanges 8. In many installations the motor is installed with the base and flanges in horizontal position and the shaft 3 in horizontal position. The motor is operative, however, in other positions and in the present case the plane of the base is approximately vertical as illustrated. The size of the motor will vary according to circumstances, but a motor of one-sixth to one-fourth horse power is sufficient for driving a separator of common commercial size.

The motor is supported by a hanger shown in perspective in Figure 3. It has a back 12 which contacts one wall of the framework 14 of the separator. A flange 16 overlies the top of the body of the separator and has an orifice 18 which fits over a pin 20 rising from the top of the separator frame. At the bottom the hanger has a flange 20 which projects outward for supporting the lower edge of the motor base. The hanger also has wings 22 at the sides which form keepers for preventing lateral displacement of the motor base. At the outer edge of the wings are flanges 24 which project inward and serve as keepers for limiting the downward swinging movement of the motor. Flanges 24 extend obliquely upward and outward from the supporting flange 20 and hence the hanger may be regarded as having channels at the sides for receiving the flanges 8 of the motor base, and these channels are divergent upward so that the upper end of the motor base has a limited freedom of movement toward and from the frame of the separator. A tongue 26 is struck from the back of the hanger, its function being to engage the side of the frame 14 to prevent lateral vibration of the hanger.

It will be evident that when the motor is positioned in the manner indicated in Figures 1 and 2, with the bottom of the base arranged in a vertical plane and the lower edge of the base resting upon the flange 20, with the flanges 8 of the motor base projecting into the channels formed by the flanges 24 and the back 12 of the hanger, the motor will be overbalanced and tend to rotate bodily in a counter-clockwise direction, Figure 1. This tends to move the pulley 2 toward the left, and tends to tighten the belt 3 on the driven pulley 4. At the same time the connection permits slippage, for the flanges 24 being oblique permit a limited amount of movement of the motor.

It will not be necessary to describe in detail the construction of the separator for the reason that it may be greatly varied without departing from the spirit of the invention. In the present case the separator frame 14, previously mentioned, is mounted upon a pedestal 30 which supports a casing 32 in which the bowl (not shown) of the separator rotates. The bowl is rotated by a vertical shaft 34, which near its upper end has a pinion 36 which meshes with a gear wheel 38 fastened to the shaft 40 to which the driven sheave 4 is fastened. The gearing is such that the speed of the bowl will be considerably greater than the speed of the driven pulley 4, and hence there is a good deal of inertia to overcome when the mechanism is starting.

When the parts are assembled as illustrated in Figures 2 and 3 the hanger will rest firmly upon the separator and may be regarded as being immovable although it may be readily detached by lifting the flange 16 up over the pin 20. The lower end of the motor base will rest upon the horizontal flange 20 and will practically form a supporting hinge in view of the obliquity of the flanges 24. It may be said that the motor is articulately connected to the separator through the agency of the hanger and that it has a limited angular bodily movement about the flange 20 as an axis. The belt 4 is so selected that it will draw the pulley 2 toward it sufficiently to hold the base flanges 8 away from the front flanges 24. This will keep the belt under tension due to the fact that the center of gravity of the motor (which is usually somewhere near the center of the body of the motor) is located at side of the point of support. If the belt should break or be removed the motor will swing downward, but only a few degrees until the base flanges engage the front flanges 24 of the hanger. The belt is constantly under tension under ordinary operating conditions, and this tension is the result of the fact that the motor is supported at a point located at one side of its center of gravity. In starting small motors it is customary to turn on full current at starting. Ordinarily this does no harm as the load is usually light and the motor accelerates promptly, thus generating sufficient counter E. M. F. to protect the armature windings. In driving a cream separator, however, the inertia is so great that speed is attained slowly, and the motor would become unduly heated if such a small motor were geared positively to the separator bowl. With my construction, however, slippage is possible until the bowl is rotating fast enough to enable the motor to generate a sufficient amount of counter E. M. F. for protective purposes.

My construction has another advantage in that as the belt stretches the motor can swing about its supporting bracket 20 sufficiently to maintain the tension. Therefore it is not necessary to exercise any special degree of care in determining the length of the belt.

Having thus described my invention what I claim as new and desire to secure by Letters Patent is:

1. A hanger for supporting electric motors having a seat for carrying the weight of the motor, and upright channels at opposite ends of said seat, the walls of the channels diverging upward.

2. A hanger for supporting electric motors having a seat for carrying the weight of the motor, and upright channels at opposite ends of said seat, the walls of the channels diverging upward, said hanger having an upright back and a horizontal flange at the top of the back by which the hanger may be supported.

3. A support for an electric motor having a base provided with lateral flanges, said support having upright channels spaced apart for receiving the motor base flanges, said support having a seat to the lower end of the channels, and said channels being of greater thickness than the flanges at the upper ends of the flanges to thereby permit the motor to pivot on said seat.

4. A support for an electric motor of the type in which the motor has a base arranged parallel with the motor shaft, said support having a seat for one end of the motor base to support the motor with its shaft in substantially upright position, said support also having means for loosely engaging the motor base at a point above and remote from the seat to thereby permit the motor to pivot upon the seat and the motor and motor shaft to swing in a vertical plane.

5. A support for an electric motor of the type in which the motor has a base arranged parallel with the motor shaft, and the base has lateral flanges, said support having a seat for one end of the motor base to thereby support the motor with the motor shaft in upright position, and upright channels above said seat for accommodating the lateral flanges of the base, said channels being wide enough at the upper portion to permit the motor base to pivot upon said seat and the motor and motor shaft to swing in a vertical plane.

6. A support for an electric motor of the type in which the motor has a flat base and a shaft arranged parallel to it, said support having a flange at its upper edge by which it may be suspended, and a seat near the lower end for supporting the end of the motor base to thereby support the motor with the motor shaft in substantially upright position, vertical marginal flanges on said support for preventing movement of the motor base in a horizontal direction transverse to said flanges, and means for loosely engaging a portion of the motor base remote from and above the said seat for permitting a limited rotation of the motor and motor shaft in a vertical plane about the seat as a pivot.

In witness whereof, I have hereunto subscribed my name.

JACOB J. STAMPEN.